(12) United States Patent
Koyama

(10) Patent No.: US 11,776,111 B2
(45) Date of Patent: Oct. 3, 2023

(54) INFORMATION PROCESSING APPARATUS, CONTROL METHOD FOR INFORMATION PROCESSING APPARATUS, IMAGE FORMING SYSTEM, AND NON-TRANSITORY COMPUTER-READABLE STORAGE MEDIUM FOR DETECTION OF MALFUNCTION OF CONVEYING DEVICE THAT CONVEYS MEDIUM TO PRINT ENGINE OF IMAGE FORMING APPARATUS AND CORRECTION OF AMOUNT OF CONVEYANCE PERFORMED BY THE CONVEYING DEVICE BASED ON THE DETECTION

(71) Applicant: Takahiro Koyama, Kanagawa (JP)

(72) Inventor: Takahiro Koyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 216 days.

(21) Appl. No.: 17/093,921

(22) Filed: Nov. 10, 2020

(65) Prior Publication Data
US 2021/0166363 A1 Jun. 3, 2021

(30) Foreign Application Priority Data
Nov. 29, 2019 (JP) .................................. 2019-217617

(51) Int. Cl.
*G06T 7/00* (2017.01)
(52) U.S. Cl.
CPC ................ *G06T 7/001* (2013.01); *G06T 7/97* (2017.01); *G06T 2207/10004* (2013.01)
(58) Field of Classification Search
CPC . G06T 7/001; G06T 2207/10004; G06T 7/97; G06T 7/0002; G06T 2207/30204
See application file for complete search history.

(56) References Cited

U.S. PATENT DOCUMENTS 10,657,635 B2 * 5/2020 Kaneko .................. G06T 7/174
2010/0225693 A1 9/2010 Sakurada et al.
(Continued)

FOREIGN PATENT DOCUMENTS

JP H08-119533 A 5/1996
JP 08286460 A * 11/1996 .............. B41J 2/525
(Continued)

OTHER PUBLICATIONS

Japanese Office Action dated Jul. 11, 2023 for corresponding Japanese Application No. 2019-217617.

*Primary Examiner* — Andrae S Allison
*Assistant Examiner* — Phuong Hau Cai
(74) *Attorney, Agent, or Firm* — Harness, Dickey & Pierce, P.L.C.

(57) ABSTRACT

An information processing apparatus includes circuitry configured to: acquire, as a first image, a read image of an image formed on a medium; generate a second image based on document data; detect reference points from the second image; compare the first image with the second image to calculate an amount of positional deviation of the medium for each of the reference points; detect, based on the amount of positional deviation, a malfunction of a conveying device that conveys the medium; cause an image forming apparatus to print a correction chart for correction of conveyance of the medium, in response to detection of the malfunction of the conveying device; calculate, from a read image of the correction chart, an amount of fluctuation in conveyance of the medium performed by the conveying device; and calculate a correction value for the calculated amount of fluctuation in conveyance of the medium.

16 Claims, 11 Drawing Sheets

(56) References Cited

U.S. PATENT DOCUMENTS

| | | | | |
|---|---|---|---|---|
| 2011/0211031 A1* | 9/2011 | Satoh | ...................... | B65H 23/16 |
| | | | | 347/104 |
| 2014/0268207 A1* | 9/2014 | Fukase | ................. | G06K 15/027 |
| | | | | 358/1.14 |
| 2018/0272775 A1* | 9/2018 | Muramatsu | .......... | G06K 15/027 |

FOREIGN PATENT DOCUMENTS

| | | | | |
|---|---|---|---|---|
| JP | 2005227142 A * | 8/2005 | | |
| JP | 2007168226 A * | 7/2007 | | |
| JP | 2010-201792 | 9/2010 | | |
| JP | 2012-040852 | 3/2012 | | |
| JP | 2012141390 A * | 7/2012 | ......... | G03G 15/0194 |
| JP | 2014-199248 A | 10/2014 | | |
| JP | 2015123635 A * | 7/2015 | | |
| JP | 2019069625 A * | 5/2019 | ............ | B41J 2/2135 |
| WO | WO-2015045454 A1 * | 4/2015 | ............ | B41J 2/2135 |

\* cited by examiner

INFORMATION PROCESSING APPARATUS, CONTROL METHOD FOR INFORMATION PROCESSING APPARATUS, IMAGE FORMING SYSTEM, AND NON-TRANSITORY COMPUTER-READABLE STORAGE MEDIUM FOR DETECTION OF MALFUNCTION OF CONVEYING DEVICE THAT CONVEYS MEDIUM TO PRINT ENGINE OF IMAGE FORMING APPARATUS AND CORRECTION OF AMOUNT OF CONVEYANCE PERFORMED BY THE CONVEYING DEVICE BASED ON THE DETECTION

CROSS-REFERENCE TO RELATED APPLICATION

This patent application is based on and claims priority pursuant to 35 U.S.C. § 119(a) to Japanese Patent Application No. 2019-217617, filed on Nov. 29, 2019, in the Japan Patent Office, the entire disclosure of which is hereby incorporated by reference herein.

BACKGROUND

Technical Field

Embodiments of the present disclosure relate to an information processing apparatus, a control method for the information processing apparatus, an image forming system, and a non-transitory computer-readable storage medium storing computer-readable program code that causes the information processing apparatus to perform the control method.

Related Art

When a conveying device such as a conveyance roller conveys media in a typical image forming apparatus, the amount of conveyance of the media may fluctuate depending on, e.g., how the conveying device is attached, the eccentricity of the conveying device, and the characteristics of the media.

SUMMARY

In one embodiment of the present disclosure, a novel information processing apparatus includes circuitry. The circuitry is configured to acquire, as a first image, a read image of an image formed on a medium. The circuitry is configured to generate, as a second image, an image to be compared with the first image, based on document data. The circuitry is configured to detect a plurality of reference points from the second image. The circuitry is configured to compare the first image with the second image to calculate an amount of positional deviation of the medium for each of the plurality of reference points. The circuitry is configured to detect, based on the amount of positional deviation, a malfunction of a conveying device that conveys the medium. The circuitry is configured to cause an image forming apparatus to print a correction chart for correction of conveyance of the medium, in response to detection of the malfunction of the conveying device. The circuitry is configured to calculate, from a read image of the correction chart, an amount of fluctuation in conveyance of the medium performed by the conveying device. The circuitry is configured to calculate a correction value for the calculated amount of fluctuation in conveyance of the medium.

Also described are novel control method for the information processing apparatus, image forming system, and non-transitory computer-readable storage medium storing computer-readable program code that causes the information processing apparatus to perform the control method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
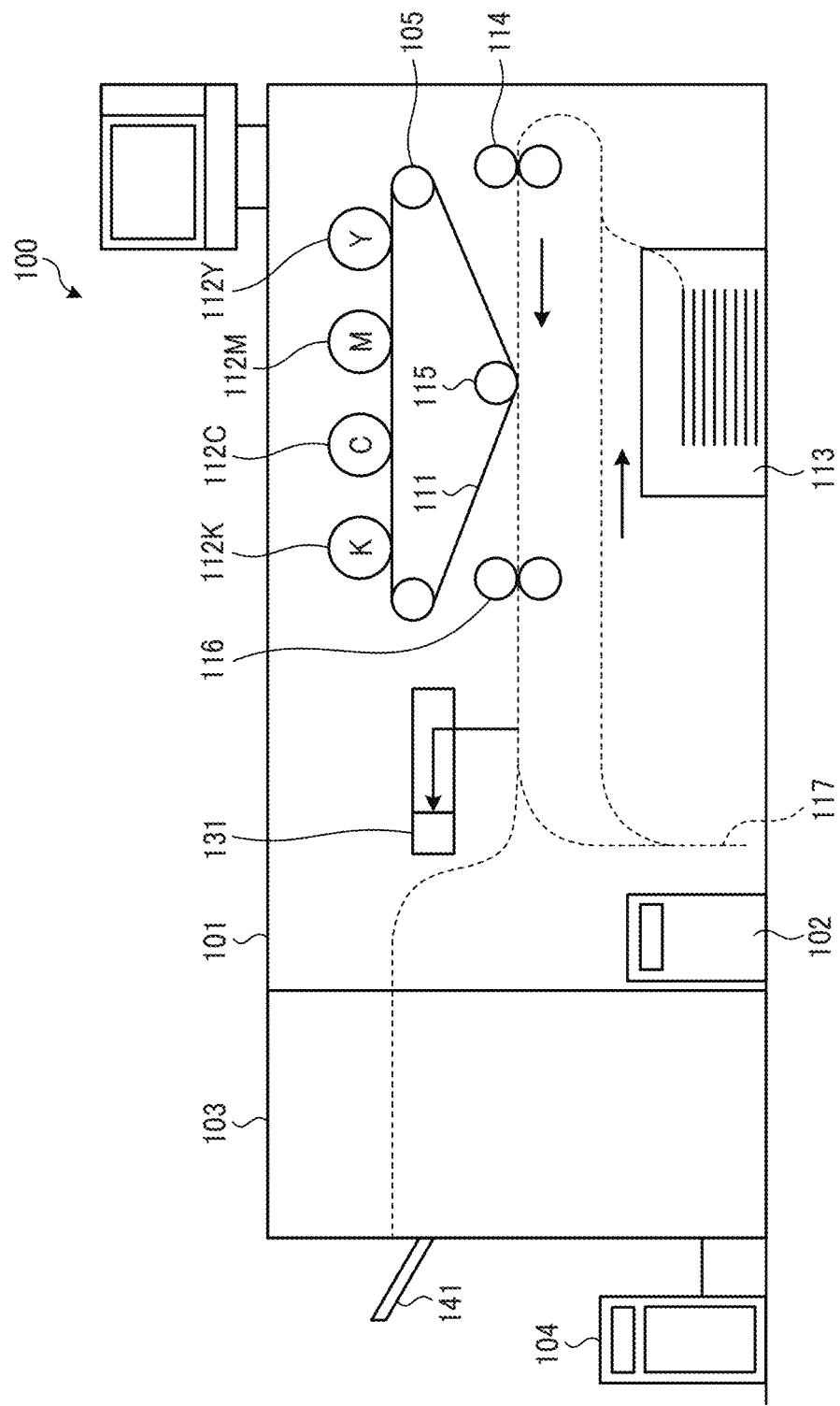
FIG. 1 is a diagram illustrating a configuration of an image forming system, according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

As used herein, the singular forms "a," "an," and "the" are intended to include the plural forms as well, unless the context clearly indicates otherwise.

It is to be noted that, in the following description, suffixes Y, M, C. and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Initially with reference to FIG. 1, a description is given of a configuration of an image forming system.

FIG. 1 is a diagram illustrating a configuration of an image forming system 100, according to an embodiment of the present disclosure.

The image forming system 100 includes a digital front end (DFE) 104, a printer 101, an inspection apparatus 102, and a stacker 103. The printer 101 is connected to the DFE 104 and the inspection apparatus 102 via the respective dedicated interfaces.

The DFE 104 is an image processing apparatus. Specifically, the DFE 104 generates print data to be printed and output according to a print job received from an apparatus (i.e., client) such as a personal computer (PC). More specifically, the DFE 104 generates bitmap data, which is data of an output target image. Then, the DFE 104 transmits the generated bitmap data to the printer 101.

The printer 101 causes a print engine 105 to form and output an image according to the bitmap data received from the DFE 104. The printer 101 also transmits, to the inspection apparatus 102, the bitmap data received from the DFE 104 as information that is the basis of a master image, which is used by the inspection apparatus 102 as a reference to inspect the image formed and output by the print engine 105. The printer 101 is an example of an image forming apparatus.

Specifically, the printer 101 is an image forming apparatus that forms and outputs an image on a medium such as print paper according to the bitmap data. In addition to the print paper, a sheet-like material on which an image can be formed and output may be used as the medium, such as a film or a plastic sheet.

The print engine 105 has a tandem structure in which drum-shaped photoconductors 112Y, 112M, 112C, and 112K for different colors are arranged side by side along an endless conveyor belt 111 serving as a mover. Hereinafter, the photoconductors 112Y, 112M, 112C, and 112K may be collectively referred to as photoconductors 112.

More specifically, the photoconductors 112Y, 112M, 112C, and 112K are aligned in this order along the conveyor belt 111, from an upstream side of a moving direction of the conveyor belt 111, to form an intermediate transfer image on the conveyor belt 111 serving as an intermediate transfer belt. The intermediate transfer image is then transferred onto a medium fed from an input tray 113 and conveyed by a conveyance roller pair 114 serving as a conveying device that conveys the medium.

A latent image is developed with toner into a toner image on a circumferential surface of each of the photoconductors 112 for different colors, namely, black (K), cyan (C), magenta (M), and yellow (Y). The black, cyan, magenta, and yellow toner images are transferred from the respective photoconductors 112 onto the conveyor belt 111 such that the toner images are superimposed one atop another on the conveyor belt 111. Thus, a composite full-color toner image (i.e., intermediate transfer image) is formed on the conveyor belt 111.

At a position closest to a conveyance passage of the medium indicated by a broken line in FIG. 1, a transfer roller 115 transfers the full-color image from the conveyor belt 111 onto the medium conveyed along the conveyance passage. Hereinafter, such a conveyance passage of the medium is referred to as a medium conveyance passage.

Note that, in the present embodiment, the print engine 105 of the printer 101 is described as a device that forms an image by electrophotography. In other words, the printer 101 is described as an electrophotographic image forming apparatus employing an electrophotographic printing system. However, the printer 101 is not limited to an electrophotographic image forming apparatus. Alternatively, the printer 101 may be a printer employing another image forming system, such as an inkjet printer employing an inkjet printing system.

The medium bearing the full-color image is further conveyed to a fixing roller pair 116, which fixes the full-color image on the medium. Thereafter, the medium bearing the fixed image is conveyed to the inspection apparatus 102.

The inspection apparatus 102 is an apparatus that detects a malfunction in medium conveyance. In the present example, the inspection apparatus 102 is an information processing apparatus that includes a reading device 131. Alternatively, the printer 101 serving as an image forming apparatus may include the reading device 131. The reading device 131 reads each side of the medium conveyed via the fixing roller pair 116.

The inspection apparatus 102 compares the image read by the reading device 131 with a master image described later, to detect the malfunction in medium conveyance. A detailed description of the inspection apparatus 102 is deferred. In the case of single-sided printing, the medium is inspected by the inspection apparatus 102 and then discharged to the stacker 103.

By contrast, in the case of double-sided printing, the medium is inspected by the inspection apparatus 102 and then conveyed to an inversion path 117 through which the medium is inverted. Then, the medium is conveyed again to a transfer position at which the transfer roller 115 is located. At the transfer position, a toner image is transferred onto the other side of the medium opposite the side subjected to the single-sided printing. Then, the medium is conveyed to the fixing roller pair 116, which fixes the toner image onto the other side of the medium. Thereafter, the inspection apparatus 102 inspects the medium subjected to double-sided printing. After the medium is inspected by the inspection apparatus 102, the medium is discharged to the stacker 103.

The stacker 103 outputs the medium discharged from the printer 101 onto a tray 141. Thus, the stacker 103 stacks media on the tray 141.

Figure 2:
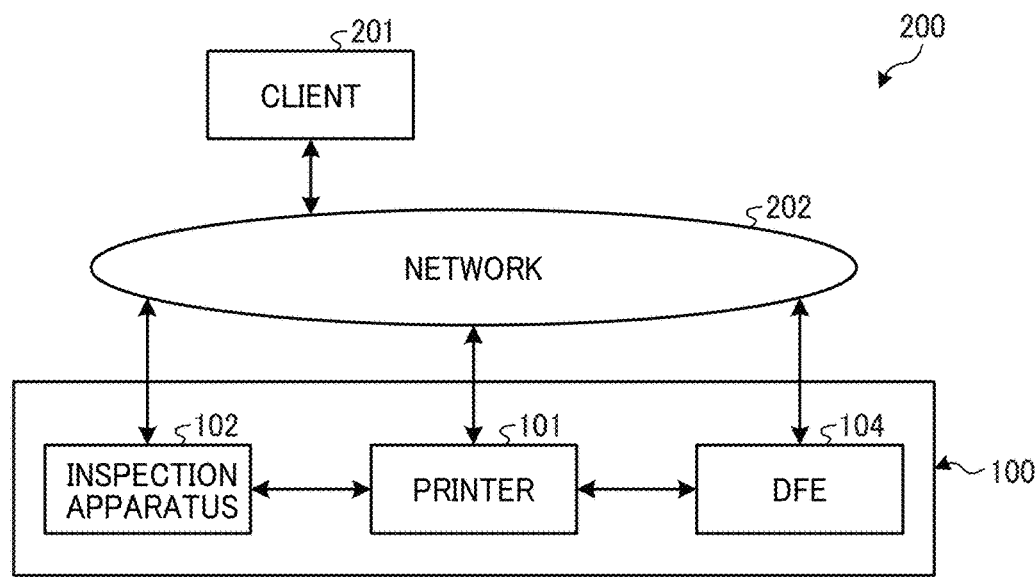
FIG. 2 is a schematic block diagram illustrating a configuration of an information processing system, according to an embodiment of the present disclosure.

Referring now to FIG. 2, a description is given of an information processing system.

FIG. 2 is a schematic block diagram illustrating a configuration of an information processing system 200, according to an embodiment of the present disclosure.

The information processing system 200 including the image forming system 100 includes a client 201, in addition to the image forming system 100.

The client 201 is connected to each of the DFE 104, the printer 101, and the inspection apparatus 102 of the image forming system 100 via a network 202. The network 202 is, e.g., a local area network (LAN) or the Internet.

The client 201 is an information processing apparatus having a communication function and a content output function. The client 201 is a terminal apparatus such as a PC or a tablet terminal. The client 201 transmits a print job to the DFE 104 via the network 202.

Thus, the DFE 104 receives the print job from the client 201. Alternatively, the DFE 104 may receive a print job from the printer 101 or the inspection apparatus 102 via the network 202.

Figure 3:
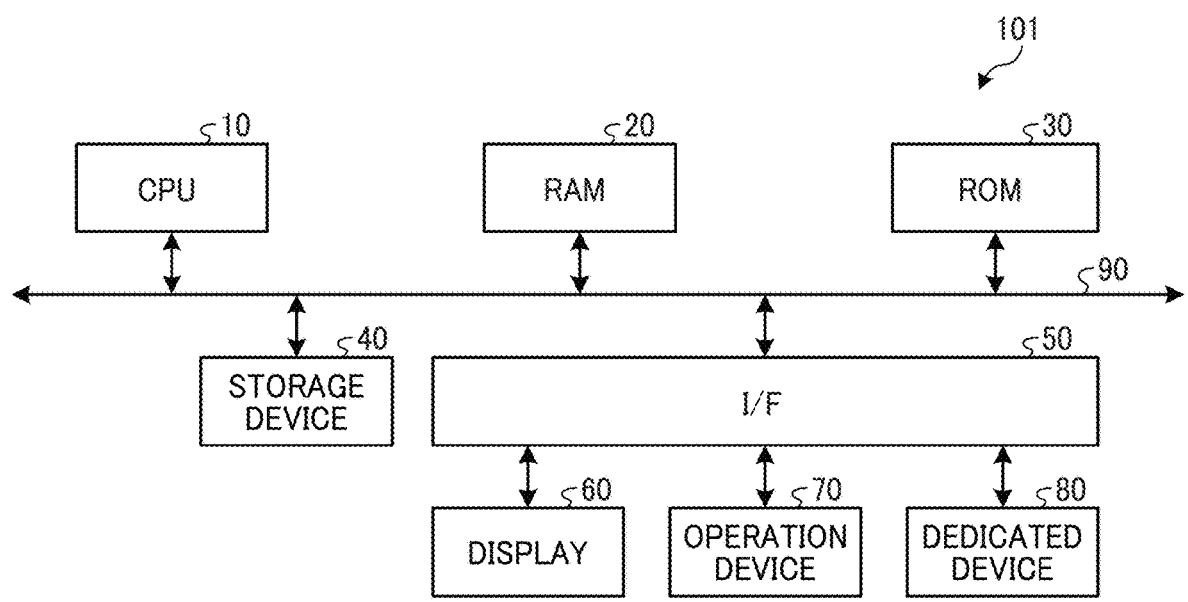
FIG. 3 is a block diagram illustrating a hardware configuration of a controller of a printer, according to an embodiment of the present disclosure.

Referring now to FIG. 3, a description is given of a hardware configuration of a controller of each of the printer 101, the inspection apparatus 102, the DFE 104, and the client 201, according to the present embodiment.

FIG. 3 is a block diagram illustrating a hardware configuration of a controller of the printer 101, according to an embodiment of the present disclosure.

The controller of the DFE 104, the controller of the inspection apparatus 102, and the controller of the client 201 have substantially the same hardware configurations as the hardware configuration of the controller of the printer 101. FIG. 3 illustrates the hardware configuration of the controller the printer 101, as a representative of the respective controllers of the printer 101, the DFE 104, the inspection apparatus 102, and the client 201.

According to the present embodiment, the controller of the printer 101 has substantially the same configuration as the configuration of general PCs or servers.

Specifically, according to the present embodiment, the controller of the printer 101 includes a central processing unit (CPU) 10, a random access memory (RAM) 20, a read only memory (ROM) 30, a storage device 40, and an interface (I/F) 50, which are connected to each other via a bus 90. The I/F 50 is connected to a display 60, an operation device 70, and a dedicated device 80.

The CPU 10 is an arithmetic device that controls the operation of the entire printer 101. The RAM 20 is a volatile storage medium that allows data to be read and written at highspeed. The CPU 10 uses the RAM 20 as a work area for data processing. The ROM 30 is a non-volatile, read-only storage medium that stores a program such as firmware.

The storage device 40 is a non-volatile storage medium that allows data to be read and written. The storage device 40 stores an operating system (OS), various kinds of control programs, and application programs. The storage device 40 is, e.g., a hard disk drive (HDD) or a solid state drive (SSD).

The I/F 50 connects the bus 90 to various kinds of hardware components or a network for control. The display 60 is a visual user interface that allows a user to ascertain the state of the printer 101. The display 60 is a display device such as a liquid crystal display or an organic electroluminescence (OEL) display. The operation device 70 is a user interface, such as a keyboard or a mouse, for a user to input data to the printer 101.

The dedicated device 80 is a hardware component that implements a dedicated function in each of the printer 101, the inspection apparatus 102, the DFE 104, and the client 201. In the case of the printer 101, examples of the dedicated device 80 include, but are not limited to, a conveyance assembly that conveys a medium on which an image is formed and output and a plotter that forms and outputs an image on the medium such as a sheet of paper.

In the case of the inspection apparatus 102, the dedicated device 80 is an arithmetic device dedicated to high-speed image processing, for example. Such an arithmetic device is configured as an application specific integrated circuit (ASIC), for example. The reading device 131 that reads an image output on a medium is also implemented by the dedicated device 80.

In such a hardware configuration, the CPU 10 executes calculation according to a program stored in the ROM 30 or a program read into the RAM 20 from a storage medium such as the storage device 40 or an optical disk, thus configuring a software control unit.

A combination of the software control unit thus configured and hardware serves as a functional block that describes a function of each of the printer 101, the inspection apparatus 102, the DFE 104, and the client 201 according to the present embodiment.

Figure 4:
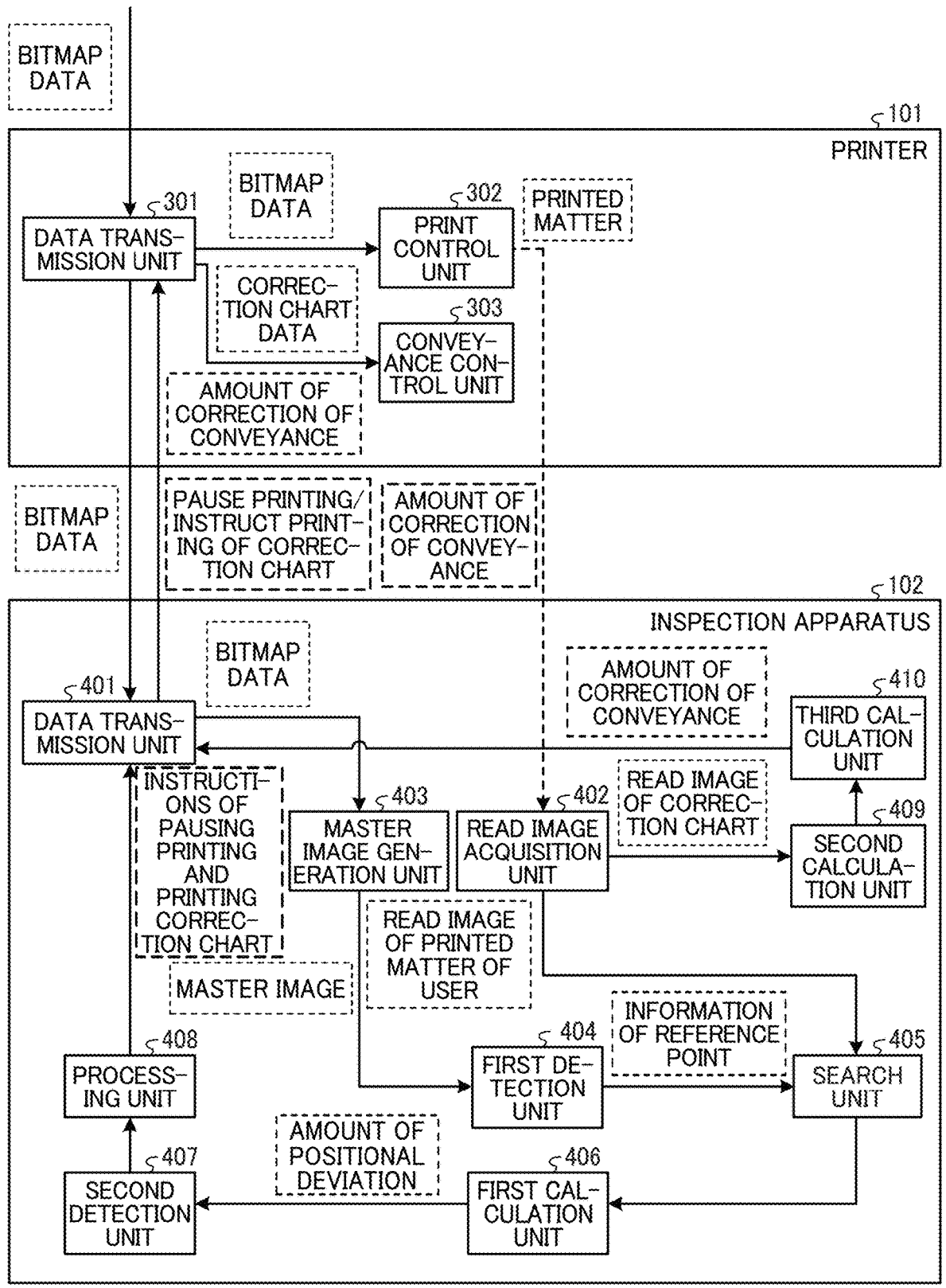
FIG. 4 is a block diagram illustrating a functional configuration of a printer and an inspection apparatus, according to an embodiment of the present disclosure.

Referring now to FIG. 4, a description is given of an image forming system.

FIG. 4 is a block diagram illustrating a functional configuration of the printer 101 and the inspection apparatus 102, according to an embodiment of the present disclosure.

In FIG. 4, the solid line indicates a flow of data; whereas, the broken line indicates a flow of a printed matter.

Now, a description is given of the functional configuration of the printer 101. The printer 101 includes a data transmission unit 301, a print control unit 302, and a conveyance control unit 303.

The data transmission unit 301 performs data transmission with the DFE 104 and the inspection apparatus 102. In the present embodiment, the data transmission unit 301 receives bitmap data transmitted from the DFE 104. The data transmission unit 301 transmits the bitmap data received from the DFE 104 to a data transmission unit 401 of the inspection apparatus 102.

The print control unit 302 causes the print engine 105 to print an image on a medium. In the present embodiment, the print control unit 302 prints the bitmap data received by the data transmission unit 301 on a medium.

When the data transmission unit 301 receives an instruction of printing a correction chart, which is used to correct an amount of conveyance of a medium, from the data transmission unit 401 of the inspection apparatus 102 described later, the print control unit 302 prints the correction chart stored in the storage device 40 of the controller of the printer 101. Note that such an amount of conveyance of a medium is hereinafter referred to as a medium conveyance amount. Note that the storage location of the correction chart is not limited to the storage device 40. Alternatively, for example, the correction chart may be stored in a storage device of the inspection apparatus 102.

The conveyance control unit 303 controls the operation of the conveying device to adjust the medium conveyance amount. In the present embodiment, the conveyance control unit 303 adjusts the medium conveyance amount, based on a correction value for the medium conveyance amount calculated by a third calculation unit 410 of the inspection apparatus 102 and transmitted from the data transmission unit 401 of the inspection apparatus 102. A detailed description of the third calculation unit 410 is deferred.

In the present embodiment, the function of each of the data transmission unit 301, the print control unit 302, and the conveyance control unit 303 described above is implemented by the CPU 10 executing a program stored in, e.g., the ROM 30. Alternatively, for example, at least part of the function of each of the data transmission unit 301, the print control unit 302, and the conveyance control unit 303 described above may be implemented by a dedicated hardware circuit.

The program executed by the printer 101 of the present embodiment may be stored in a computer-readable storage medium, such as a compact disc read-only memory (CD-ROM), a flexible disk (FD), a compact disc recordable (CD-R), and a digital versatile disk (DVD), in an installable or executable file format, to be provided.

Alternatively, the program executed by the printer 101 of the present embodiment may be stored in a computer connected to a network such as the Internet and downloaded via the network, to be provided. The program executed by the printer 101 of the present embodiment may be provided or distributed via a network such as the Internet.

Now, a description is given of a functional configuration of the inspection apparatus 102.

The inspection apparatus 102 includes the data transmission unit 401, a read image acquisition unit 402, a master image generation unit 403, a first detection unit 404, a search unit 405, a first calculation unit 406, a second detection unit 407, and a processing unit 408, a second calculation unit 409, and the third calculation unit 410.

The data transmission unit 401 exchanges data with the printer 101. In the present embodiment, the data transmission unit 401 receives bitmap data transmitted from the data transmission unit 301 of the printer 101.

The data transmission unit 401 transmits, to the data transmission unit 301 of the printer 101, an instruction of printing the correction chart for correction of the medium conveyance amount. The data transmission unit 401 also transmits, to the data transmission unit 301 of the printer 101, the correction value for the medium conveyance amount calculated by the third calculation unit 410.

The read image acquisition unit 402 acquires, as a first image, an image formed on a medium by the printer 101 and read by the reading device 131. The read image acquisition unit 402 is an example of an acquisition unit.

In the present embodiment, the first image refers to an image that is inspected to detect a malfunction in medium conveyance.

In the present embodiment, the reading device 131 reads an image printed by the print control unit 302 of the printer 101. The read image acquisition unit 402 acquires the image read by the reading device 131 serving as a first image. The reading device 131 also reads a correction chart printed by the print control unit 302 of the printer 101. The read image acquisition unit 402 acquires an image of the correction chart read by the reading device 131.

The master image generation unit 403 generates, as a second image, an image to be compared with the first image, based on document data. The master image generation unit 403 is an example of a generation unit. In the present embodiment, the master image generation unit 403 generates a master image, serving as a second image, based on the bitmap data transmitted from the data transmission unit 301 of the printer 101. Note that the master image generation unit 403 may generate a master image, based on the read image acquired by the read image acquisition unit 402.

The first detection unit 404 detects a plurality of reference points from the second image. In the present embodiment, the first detection unit 404 detects the reference points of the master image generated by the master image generation unit 403.

In the present embodiment, the reference point refers to a point existing in the master image that is used for detection of a malfunction in medium conveyance.

Figure 5:
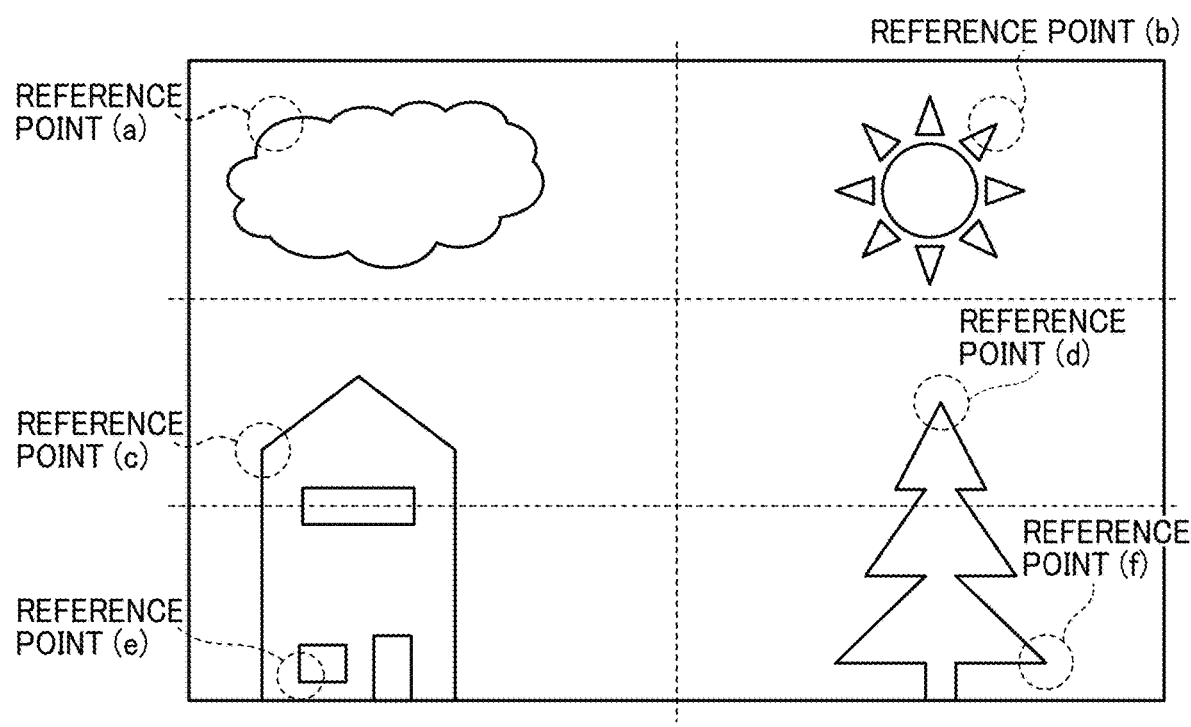
FIG. 5 is a diagram illustrating an image from which a plurality of reference points is detected, according to an embodiment of the present disclosure.

Referring now to FIG. 5, a detailed description is given of the detection of the reference points.

FIG. 5 is a diagram illustrating an image from which a plurality of reference points is detected, according to an embodiment of the present disclosure.

In the present embodiment, the first detection unit 404 detects, as a reference point, a characteristic portion of a master image. Specifically, the first detection unit 404 detects a corner detected by a corner detection method as a reference point. The corner detection method is, e.g., a Harris operator.

Note that the first detection unit 404 detects a plurality of reference points so that the distance between the reference points becomes a given value or more in a sub-scanning direction, which is a medium conveyance direction in which a medium is conveyed, so as to detect an abnormality in medium conveyance speed. Note that the medium conveyance speed is a speed at which a medium is conveyed.

In the present example, the master image is divided into six areas. One characteristic portion is detected from each of the six areas as a reference point. Note that, in a case in one or more of the six areas include few characteristic portions of the image, the reference point is detected from a detectable area. In FIG. 5, the image is divided into six areas and the reference points are detected by the corner detection method. However, the reference points may be detected in another way provided that a plurality of reference points can be detected for detection of a malfunction in medium conveyance.

The search unit 405 matches the positions of the first image and the second image to search the first image for a point corresponding to the reference point of the second image. In the present embodiment, the search unit 405 performs pattern matching on the read image with respect to a given range of area centered on a reference point detected in the master image. Hereinafter, such a reference point detected in the master image is simply referred to as a reference point.

From the result of pattern matching, the search unit 405 searches the read image for a best-matching area that best matches with the image in the given range of area centered on the reference point, and defines a center point of the best-matching area as a point corresponding to the reference point in the read image. Hereinafter, such a point corresponding to the reference point in the read image is referred to as a corresponding point. Note that the corresponding point may be searched for in another way provided that the point corresponding to the reference point can be searched for.

The first calculation unit 406 compares the first image with the second image to calculate, as an amount of positional deviation of the medium for each of the plurality of reference points, an amount of positional deviation of the corresponding point from each of the plurality of reference points. Specifically, in the present embodiment, the first calculation unit 406 calculates the difference between the coordinates of the reference point and the coordinates of the corresponding point as the amount of positional deviation. The amount of positional deviation is calculated for each of the sub-scanning direction (i.e., Y direction) and a main scanning direction (i.e., X direction) that intersects with the sub-scanning direction. Note that the main scanning direction is ideally a direction perpendicular to the sub-scanning direction.

The second detection unit 407 detects a malfunction of the conveying device that conveys a medium, based on the amount of positional deviation. In the present embodiment, the second detection unit 407 detects, in response to satisfaction of a predetermined condition, an abnormality or malfunction corresponding to the condition.

Figure 6A:
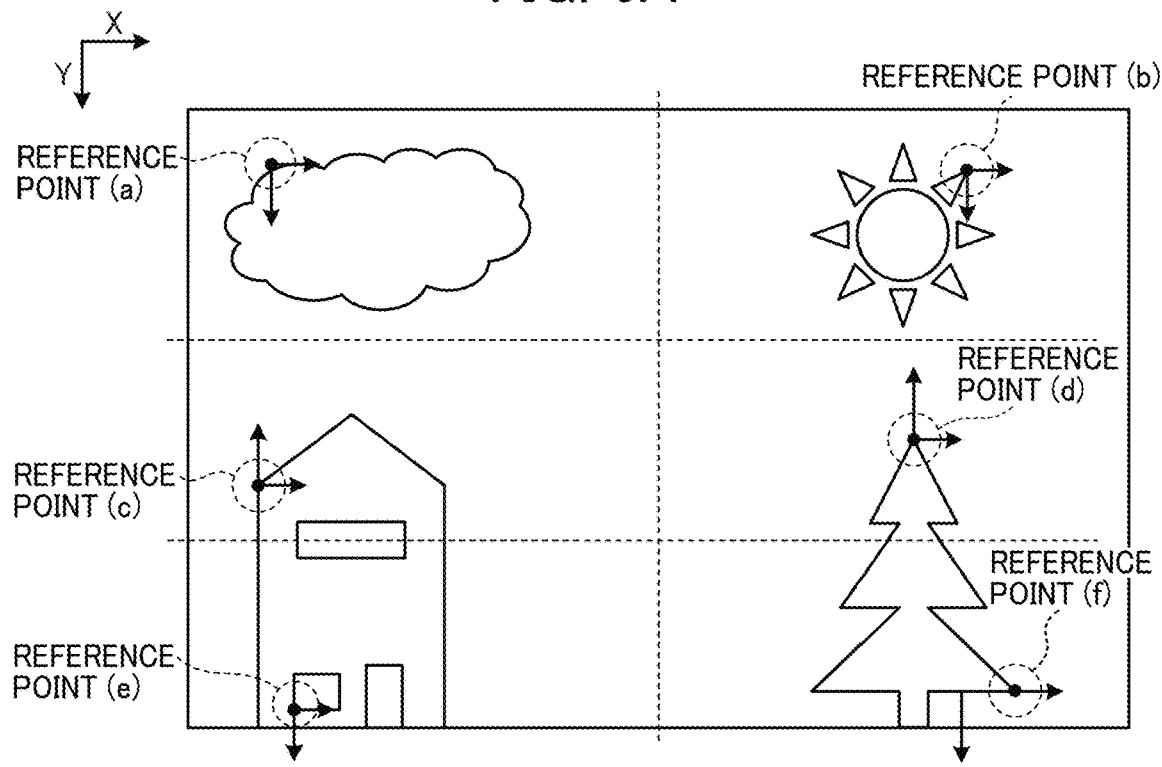
FIG. 6A is a diagram illustrating an amount of positional deviation for each reference point, according to an embodiment of the present disclosure.
Figure 6B:
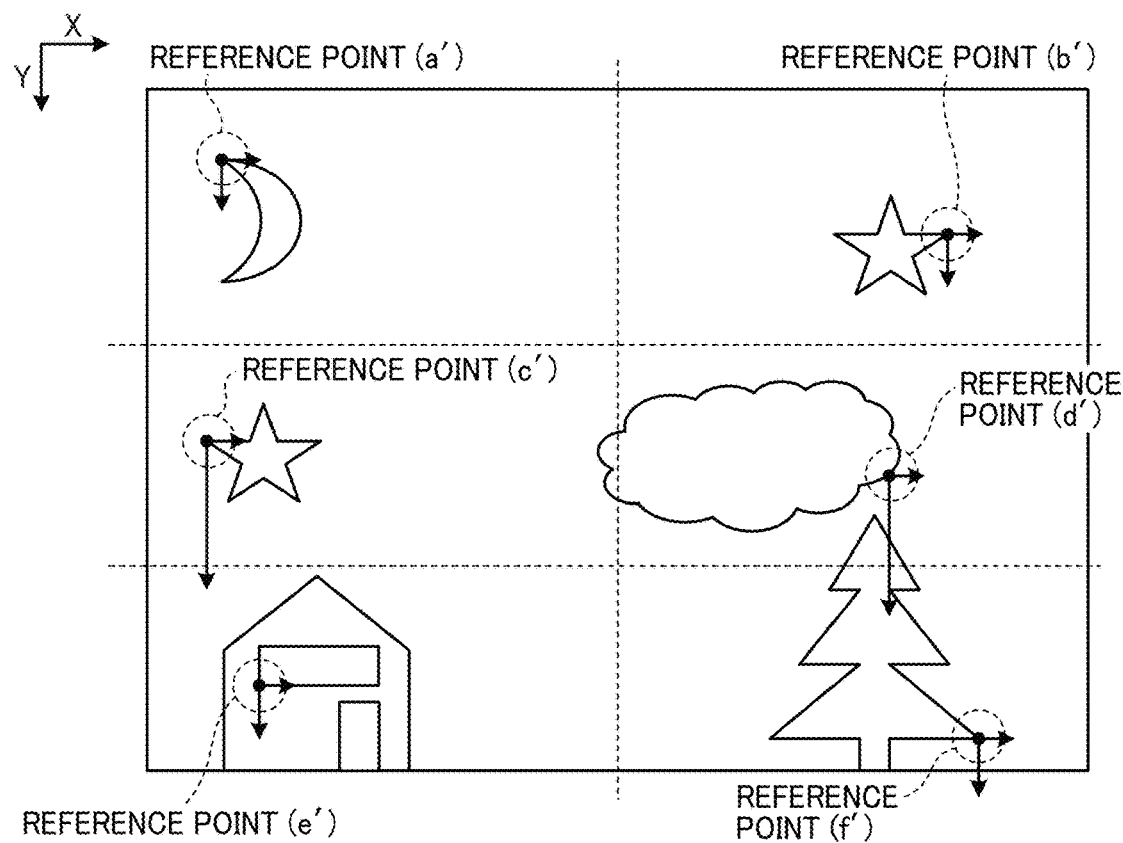
FIG. 6B is another diagram illustrating an amount of positional deviation for each reference point, according to an embodiment of the present disclosure.

Referring now to FIGS. 6A and 6B, a detailed description is given of how the second detection unit 407 detects a malfunction in medium conveyance.

FIG. 6A is a diagram illustrating an amount of positional deviation from each reference point, according to an embodiment of the present disclosure. FIG. 6B is another diagram illustrating an amount of positional deviation from each reference point, according to an embodiment of the present disclosure.

In FIGS. 6A and 6B, the arrows extending from each reference point represent vectors that indicate the magnitude (or amount) of positional deviation and the respective directions of positional deviation along the X and Y directions.

In a case in which the conveying device fluctuates in the medium conveyance amount, the conveying device fluctuates in feeding amount. As a consequence, the speed of the medium passing in front of the reading device 131 fluctuates. Therefore, the amount of positional deviation in the Y direction may change between the reference points. At this time, the image read by the reading device 131 changes to shrink when the speed is high; whereas the read image changes to stretch when the speed is low. That is, FIGS. 6A and 6B illustrate, for each reference point, an upward direction of positional deviation when the conveyance speed is high while illustrating a downward direction of positional deviation when the conveyance speed is low.

Specifically, in FIG. 6A, reference points (a) to (f) are detected. FIG. 6A illustrates a downward direction of positional deviation along the Y direction for each of the reference points (a), (b), (e), and (f). That is, the medium conveyance speed is high in the areas including the reference points (a), (b), (e), and (f). By contrast, FIG. 6A illustrates an upward direction of the positional deviation along the Y direction for each of the reference points (c) and (d). That is, the medium conveyance speed is low in the areas including the respective reference points (c) and (d).

In FIG. 6B, reference points (a') to (f) are detected. FIG. 6B illustrates a downward direction of positional deviation along the Y direction for all the reference points (a') to (f). That is, the tendency of fluctuations in the conveyance speed is substantially the same in the areas including the respective reference points (a') to (f).

However, the amount of positional deviation in the Y direction for the reference points (c') and (d') is greater than the amount of positional deviation in the Y direction for the reference points (a'), (b'), (e'), and (f). That is, the conveyance speed changes significantly from the areas including the respective reference points (a') and (b') to the areas including the respective reference points (c') and (d').

Now, a detailed description is given of the detection of an abnormality in medium conveyance speed.

Figure 7A:
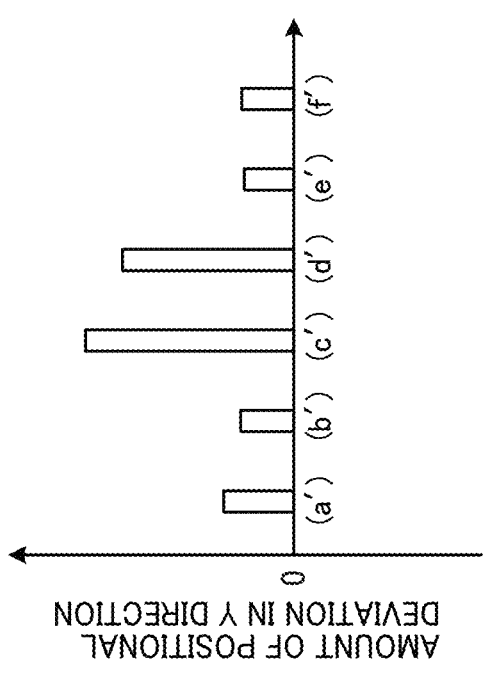
FIG. 7A is a graph illustrating an amount of positional deviation in a sub-scanning direction for each reference point, according to an embodiment of the present disclosure.
Figure 7B:
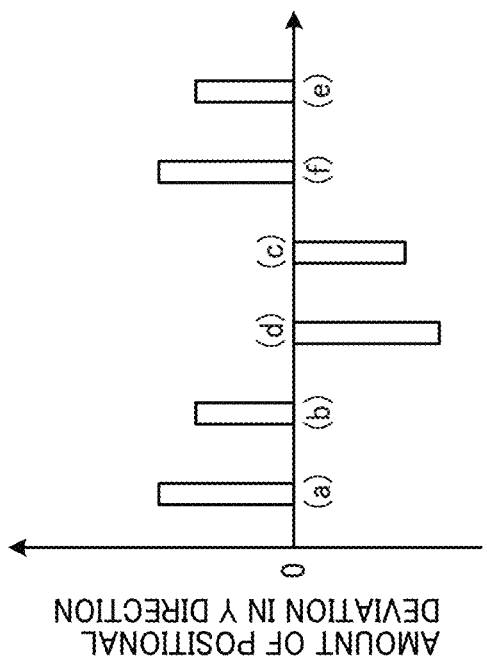
FIG. 7B is another graph illustrating an amount of positional deviation in a sub-scanning direction for each reference point, according to an embodiment of the present disclosure.

FIG. 7A is a graph illustrating an amount of positional deviation in the sub-scanning direction for each reference point, according to an embodiment of the present disclosure. FIG. 7B is another graph illustrating an amount of positional deviation in the sub-scanning direction for each reference point, according to an embodiment of the present disclosure.

FIG. 7A is a bar graph illustrating the amount of positional deviation for each reference point illustrated in FIG. 6A. In FIG. 7A, the reference points (a) to (f) are aligned in the order of coordinate values in the Y direction. Similarly, FIG. 7B is a bar graph illustrating the amount of positional deviation for each reference point illustrated in FIG. 6B. In FIG. 7B, the reference points (a') to (f) are aligned in the order of coordinate values in the Y direction.

In a case in which the medium conveyance speed does not fluctuate, a direction of positional deviation and an amount of positional deviation for a reference point is similar to a direction of positional deviation and an amount of positional deviation for another reference point close to the reference point. Therefore, the abnormality in medium conveyance speed is detected by comparing the amount of positional deviation between adjacent ones of the reference points arranged in the order of the coordinate values in the Y direction.

Specifically, when the amount of positional deviation in the sub-scanning direction calculated, for each reference point, by the first calculation unit 406 exceeds a first threshold value, the second detection unit 407 detects an abnormality in the medium conveyance speed at which the conveying device conveys a medium. More specifically, in the present embodiment, when an absolute value of the amount of positional deviation in the sub-scanning direction calculated, for each reference point, by the first calculation unit 406 exceeds the first threshold value, the second detection unit 407 detects an abnormality in the medium conveyance speed.

In the present embodiment, the first threshold value is a threshold value for detection of an abnormality in the medium conveyance speed in the conveying device of the printer 101. Note that the abnormality in the medium conveyance speed refers to a medium conveyance speed out of specified tolerance. The first threshold value is set based on premeasured fluctuations in the amount of positional deviation in the Y direction in the conveying device of the printer 101.

Figure 8A:
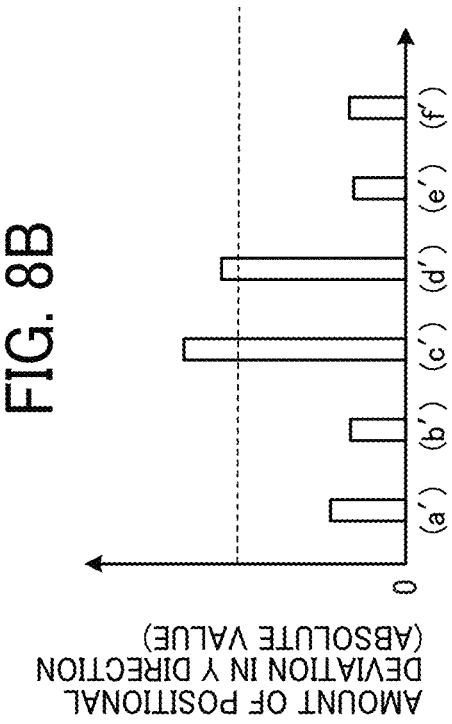
FIG. 8A is a graph illustrating an absolute value of an amount of positional deviation in a sub-scanning direction for each reference point, according to an embodiment of the present disclosure.
Figure 8B:
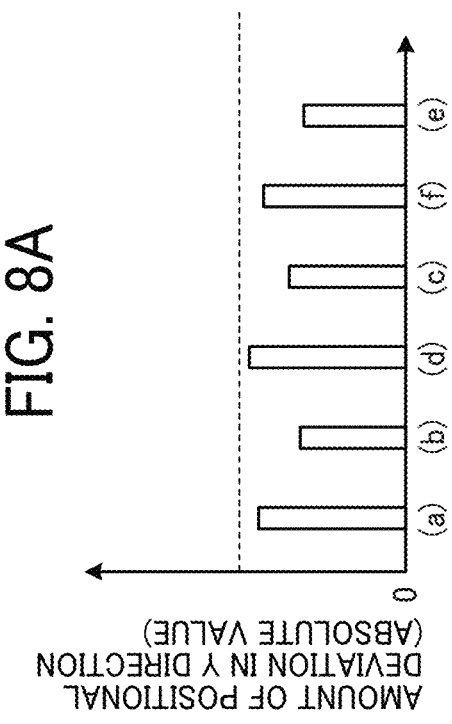
FIG. 8B is another graph illustrating an absolute value of an amount of positional deviation in a sub-scanning direction for each reference point, according to an embodiment of the present disclosure.

FIG. 8A is a graph illustrating an absolute value of an amount of positional deviation in the sub-scanning direction for each reference point, according to an embodiment of the present disclosure. FIG. 8B is another graph illustrating an absolute value of an amount of positional deviation in the sub-scanning direction for each reference point, according to an embodiment of the present disclosure.

FIGS. 8A and 8B are bar graphs illustrating the absolute value of the amount of positional deviation for each reference point illustrated in FIGS. 7A and 7B, respectively. In each of FIGS. 8A and 8B, the broken line indicates the first threshold value.

In FIG. 8A, none of the reference points (a) to (f) exceeds the first threshold value. It is therefore clear from FIG. 8A that the conveying device conveys a medium at a normal medium conveyance speed within the specified tolerance. By contrast, in FIG. 8B, the absolute value of the amount of positional deviation in the Y direction for each of the reference points (c') and (d') exceeds the first threshold value. Therefore, in this case, the second detection unit 407 detects an abnormality in the medium conveyance speed.

However, even in a case in which the conveying device conveys a medium at a normal medium conveyance speed within the specified tolerance, the medium conveyance amount may need to be corrected when the conveyance speed changes greatly between the reference points.

To address such a situation, the second detection unit 407 detects an abnormality in the medium conveyance speed in a case in which an amount of positional deviation in the sub-scanning direction calculated, for each of a plurality of reference points including first and second reference points adjacent to each other in the sub-scanning direction, by the first calculation unit 406 is equal to or less than the first threshold value and a difference value between the amount of positional deviation in the sub-scanning direction calculated for the first reference point and the amount of positional deviation in the sub-scanning direction calculated for the second reference point exceeds a second threshold value.

In the present embodiment, the second threshold value is a threshold value for detection of a change in the medium conveyance speed between the reference points.

Figure 9A:
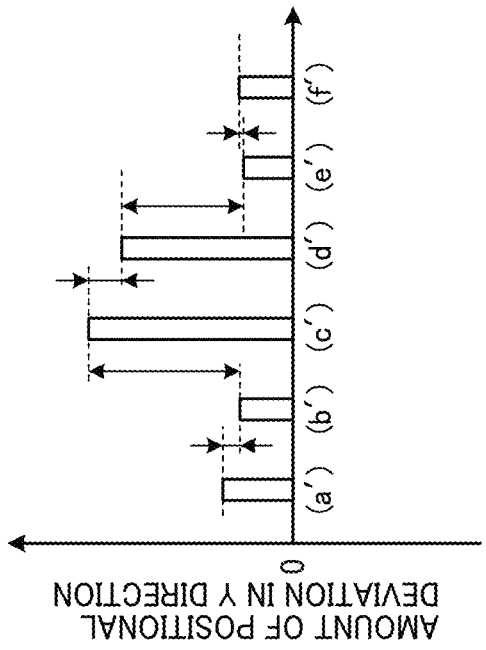
FIG. 9A is a graph illustrating a difference value between the amounts of positional deviation in a sub-scanning direction, according to an embodiment of the present disclosure.
Figure 9B:
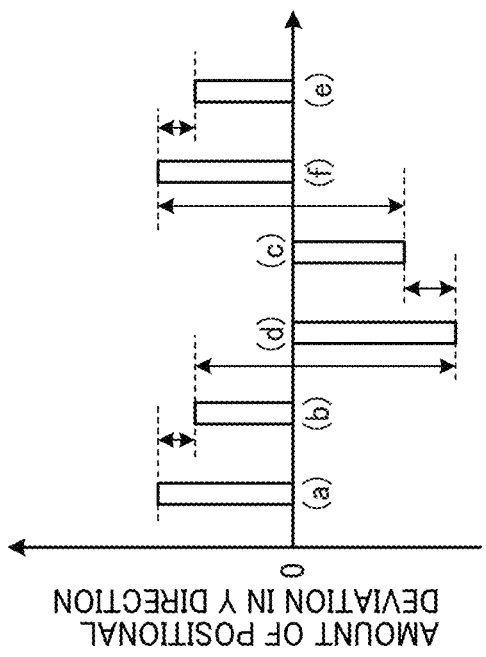
FIG. 9B is another graph illustrating a difference value between the amounts of positional deviation in a sub-scanning direction, according to an embodiment of the present disclosure.

FIG. 9A is a graph illustrating a difference value between the amounts of positional deviation in the sub-scanning direction, according to an embodiment of the present disclosure. FIG. 9B is another graph illustrating a difference value between the amounts of positional deviation in the sub-scanning direction, according to an embodiment of the present disclosure.

In FIGS. 9A and 9B, each arrow indicates a difference value between an amount of positional deviation in the Y direction for a reference point and an amount of positional deviation in the Y direction for another reference point adjacent to the reference point. In FIG. 9A, the difference value between the reference points (b) and (d) and the difference value between the reference points (c) and (f) exceed the second threshold value.

In this case, the second detection unit 407 detects an abnormality in the medium conveyance speed because the difference value between the reference points (b) and (d) and the difference value between the reference points (c) and (f) exceed the second threshold value.

Note that even in a case in which the second detection unit 407 detects an abnormality in the medium conveyance speed from the amount of positional deviation, no malfunction may actually occur in conveyance when the first calculation unit 406 fails to calculate the amount of positional deviation.

In a case in which the first detection unit 404 divides the second image into a plurality of areas including first and second areas adjacent to each other in the main scanning direction and detects reference points corresponding to the respective areas, a direction of positional deviation and an amount of positional deviation in the sub-scanning direction for one of the reference points corresponding to the first area may be similar to a direction of positional deviation and an amount of positional deviation in the sub-scanning direction for another one of the reference points corresponding to the second area.

Therefore, when a difference value between the amount of positional deviation in the sub-scanning direction for the reference point corresponding to the first area and the amount of positional deviation in the sub-scanning direction for the reference point corresponding to the second area exceeds a given value, the first calculation unit 406 may have failed to calculate the amount of positional deviation for some reasons.

To address such a situation, the first detection unit 404 divides the second image into a plurality of areas including first and second areas adjacent to each other and detects reference points corresponding to the respective areas. The second detection unit 407 detects no abnormality in the medium conveyance speed in a case in which a difference value between the amount of positional deviation in the sub-scanning direction for one of the reference points corresponding to the first area and the amount of positional deviation in the sub-scanning direction for another one of the reference points corresponding to the second area exceeds a third threshold value.

In the present embodiment, the third threshold value is a threshold value for detecting that the first calculation unit 406 has failed to calculate the amount of positional deviation.

Figure 10:
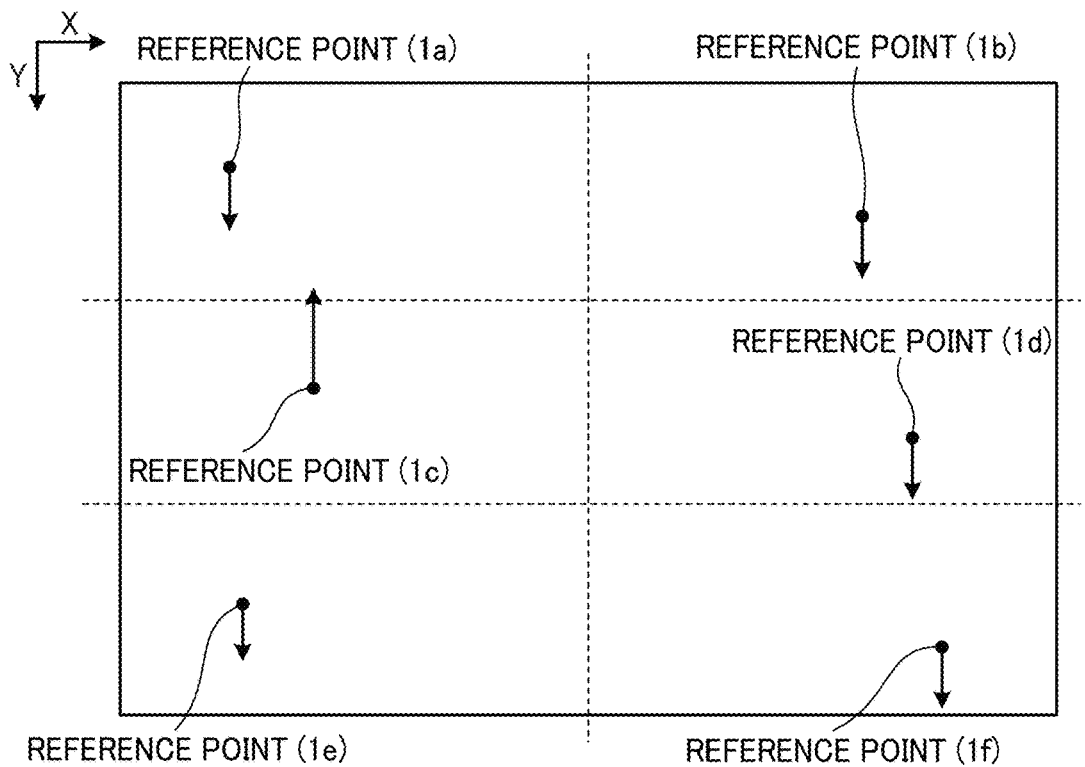
FIG. 10 is a diagram illustrating a case in which the calculation of an amount of positional deviation fails, according to an embodiment of the present disclosure.

Referring now to FIG. 10, a description is given of a failure in calculation of the amount of positional deviation.

FIG. 10 is a diagram illustrating a case in which the calculation of an amount of positional deviation fails, according to an embodiment of the present disclosure.

In FIG. 10 illustrating reference points (1a) to (1f), an absolute value of an amount of positional deviation in they direction for the reference point (1c) does not exceed the first threshold value. A difference value between an amount of positional deviation in the Y direction for the reference point (1b) and the amount of positional deviation in the Y direction for the reference point (1c) exceeds the second threshold value. A difference value between the amount of positional deviation in the Y direction for the reference point (1c) and an amount of positional deviation in the Y direction for the reference point (1d) exceeds the third threshold value.

In this case, the second detection unit 407 firstly detects an abnormality in the medium conveyance speed because the absolute value of the amount of positional deviation in the Y direction for the reference point (1c) is equal to or less than the first threshold value and because a difference value between the amount of positional deviation in the Y direction for the reference point (1b) and the amount of positional deviation in the Y direction for the reference point (1c) adjacent to the reference point (1b) in the Y direction exceeds the second threshold value.

Secondly, the second detection unit 407 detects that the first calculation unit 406 has failed to calculate the amount of positional deviation in the Y direction for the reference point (1c) because the difference value between the amount of positional deviation in the Y direction for the reference point (1c) and the amount of positional deviation in the Y direction for the reference point (1d) existing in the area adjacent to the area including the reference point (1c) in the X direction exceeds the third threshold value.

As a consequence, in this case, the second detection unit 407 detects that the first calculation unit 406 has failed to calculate the amount of positional deviation in the Y direction for the reference point (1c) and that the conveying device has no abnormality in the medium conveyance speed, because the difference value between the amount of positional deviation in the Y direction for the reference point (1b) and the amount of positional deviation in the Y direction for the reference point (1c) exceeds the second threshold value and because the difference value between the amount of positional deviation in the Y direction for the reference point (1c) and the amount of positional deviation in the Y direction for the reference point (1d) exceeds the third threshold value.

Instead of the abnormality in medium conveyance speed, an abnormal skew of a medium may cause the absolute value of the amount of positional deviation in the sub-scanning direction calculated, for each reference point, by the first calculation unit 406 exceeding the first threshold value, or may cause the difference value between the amount of positional deviation in the sub-scanning direction calculated for the first reference point and the amount of positional deviation in the Y direction calculated for the second reference point exceeding the second threshold value. Hereinafter, such an abnormal skew of a medium is referred to as an abnormal medium skew.

When an abnormal medium skew does not occur, the direction of positional deviation along the main scanning direction is substantially the same for all the reference points. By contrast, when an abnormal medium skew occurs, a direction of positional deviation along the main scanning direction for one of the reference points for which the abnormality in the medium conveyance speed is detected may be different from a direction of positional deviation along the main scanning direction for another one of the reference points for which the abnormality in the medium conveyance speed is not detected.

To address such a situation, the second detection unit 407 detects an abnormal medium skew in the conveying device in a case in which a direction of positional deviation along the main scanning direction for one of the reference points for which the abnormality in the medium conveyance speed is detected is different from a direction of positional deviation along the main scanning direction for another one of the reference points for which the abnormality in the medium conveyance speed is not detected.

Figure 11:
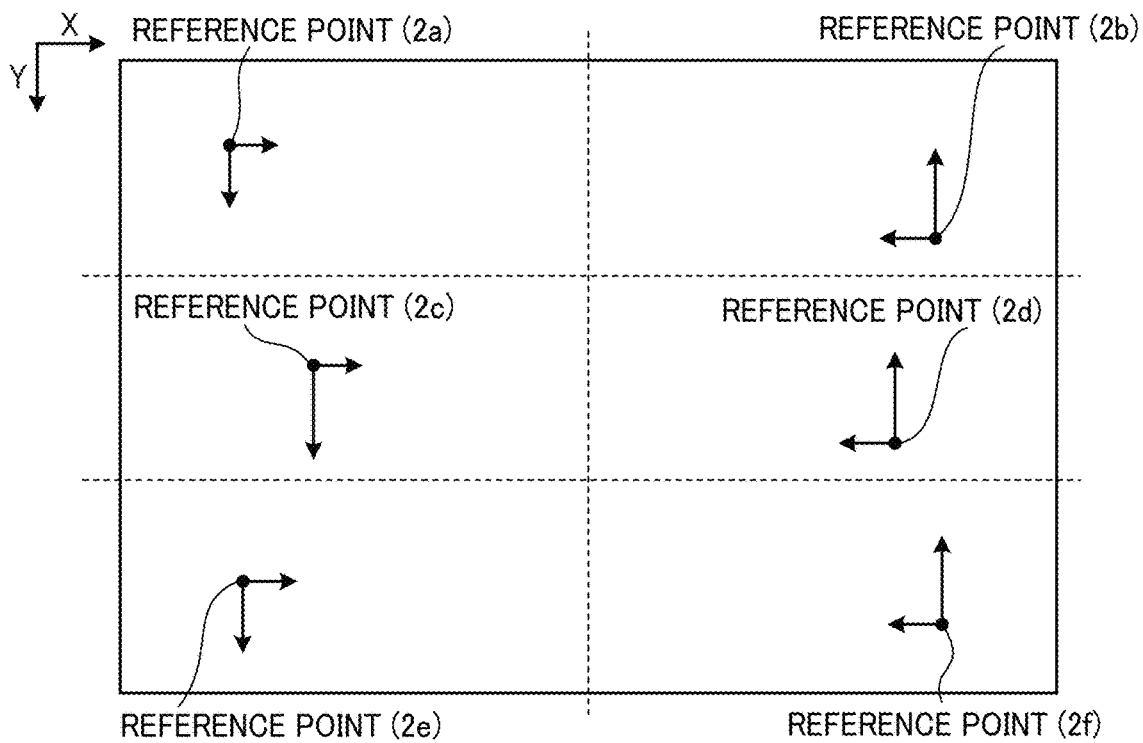
FIG. 11 is a diagram illustrating a case in which an abnormal skew occurs, according to an embodiment of the present disclosure.

FIG. 11 is a diagram illustrating a case in which an abnormal skew occurs, according to an embodiment of the present disclosure.

In FIG. 11, an abnormality in the medium conveyance speed is detected for reference points (2b), (2d), and (2f); whereas the abnormality in the medium conveyance speed is not detected for reference points (2a), (2c), and (2e).

In this case, the second detection unit 407 firstly detects the abnormality in the medium conveyance speed for the reference points (2b), (2d), and (2f).

However, since the direction of positional deviation along the X direction for the reference points (2b), (2d), and (2f) for which the abnormality in the medium conveyance speed is detected is different from the direction of positional deviation along the X direction for the reference points (2a), (2c), and (2e) for which the abnormality in the medium conveyance speed is not detected, the second detection unit 407 detects an abnormal medium skew, instead of the abnormality in the medium conveyance speed.

Referring back to FIG. 4, the processing unit 408 performs processing when the second detection unit 407 detects a malfunction of the conveying device. Specifically, in the present embodiment, when the second detection unit 407 detects a malfunction of the conveying device, the processing unit 408 causes the printer 101 to print a correction chart for correction of the medium conveyance amount. The processing unit 408 also causes the printer 101 to pause printing.

More specifically, in the present example, when the second detection unit 407 detects a malfunction of the conveying device, the processing unit 408 causes the data transmission unit 401 to transmit an instruction of pausing printing to the printer 101. At this time, the processing unit 408 causes the data transmission unit 401 to transmit an instruction of printing the correction chart to the printer 101.

Note that the processing unit 408 performs the aforementioned processing in substantially the same manner both when the second detection unit 407 detects an abnormality in medium conveyance speed and when the second detection unit 407 detects an abnormal skew. In response to the aforementioned processing performed by the processing unit 408, the print control unit 302 of the printer 101 causes the print engine 105 to pause printing and print the correction chart stored in the storage device 40 of the controller of the printer 101.

The second calculation unit 409 calculates an amount of fluctuation in conveyance of a medium performed by the conveying device from a result of reading the correction chart printed, in response to the second detection unit 407 detecting the malfunction of the conveying device, for correction of the medium conveyance amount.

Specifically, in the present embodiment, the second calculation unit 409 calculates the amount of fluctuation in conveyance of the medium performed by the conveying device from a read image of the correction chart printed by the print control unit 302 of the printer 101 in response to the instruction of printing the correction chart transmitted from the data transmission unit 401.

The third calculation unit 410 calculates a correction value for the amount of fluctuation in conveyance of the medium calculated by the second calculation unit 409.

Figure 12:
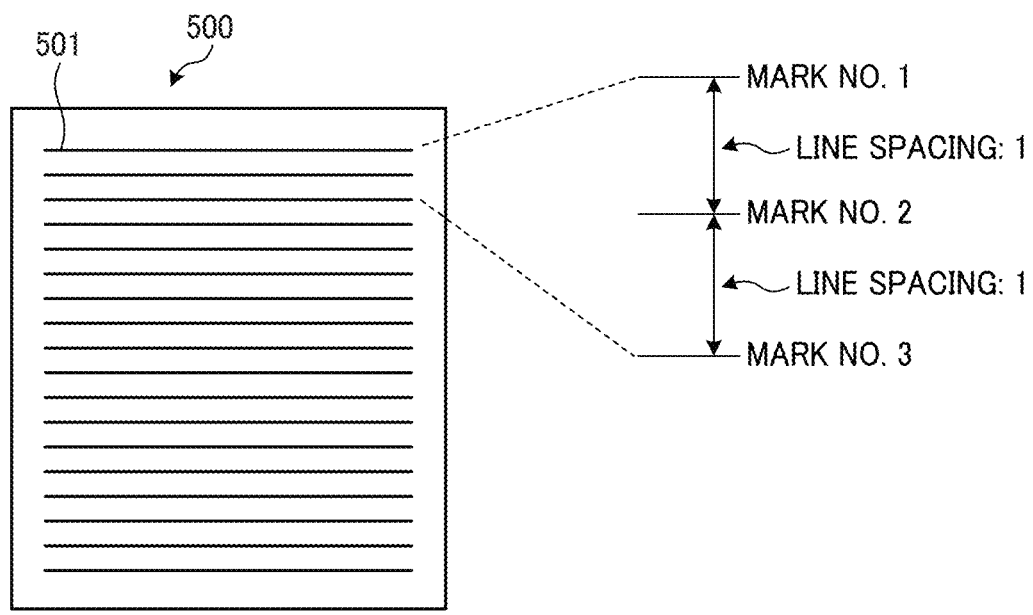
FIG. 12 is a diagram illustrating a correction chart, according to an embodiment of the present disclosure.

Referring now to FIG. 12, a detailed description is given of the correction chart.

FIG. 12 is a diagram illustrating a correction chart 500, according to an embodiment of the present disclosure.

In the correction chart 500, ruled lines (hereinafter referred to as marks 501) are aligned at equal intervals. The marks 501 are aligned at equal intervals, keeping the line spacing at one.

The reading device 131 reads, as an image, the correction chart 500 printed by the printer 101 in response to the processing performed by the processing unit 408. The read image acquisition unit 402 acquires the image of the correction chart 500 read by the reading device 131.

The second calculation unit 409 detects the marks 501 from the image of the correction chart 500 acquired by the read image acquisition unit 402 to calculate the amount of fluctuation in conveyance of the medium performed by the conveying device. Note that the marks 501 may be detected in another way. For example, a reading sensor 151 may be disposed above the medium conveyance passage to detect the marks 501.

Figure 13:
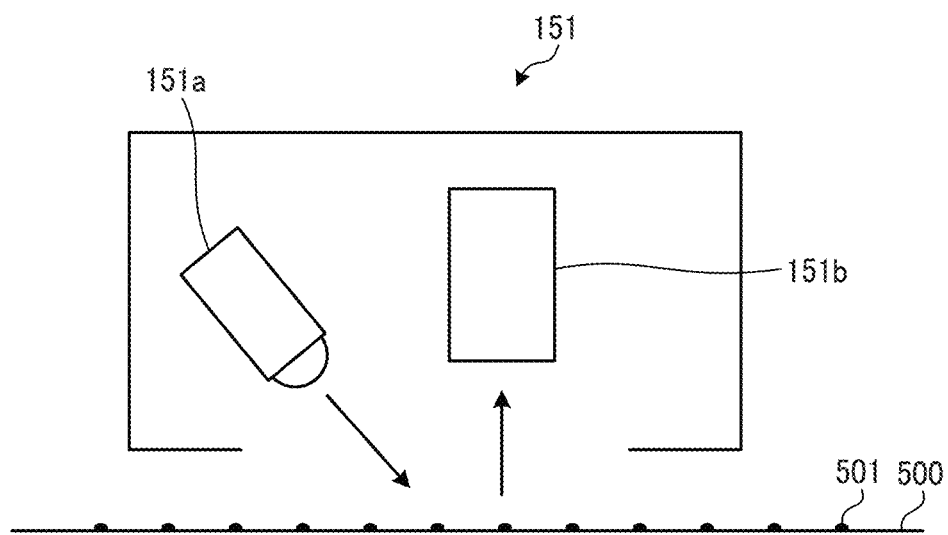
FIG. 13 is a diagram illustrating a configuration of a reading sensor, according to an embodiment of the present disclosure.

Referring now to FIG. 13, a description is given of a case in which the marks 501 are detected with the reading sensor 151.

FIG. 13 is a diagram illustrating a configuration of the reading sensor 151, according to an embodiment of the present disclosure.

The reading sensor 151 includes a light emitting unit 151a and a light receiving unit 151b.

The light emitting unit 151a emits light. The light emitted from the light emitting unit 151a is reflected from the surface of the correction chart 500. The light receiving unit 151*b* detects, as a reflected light intensity, an amount of the light reflected from the surface of the correction chart 500. The reading sensor 151 detects the marks 501 aligned on the correction chart 500, based on the amount of the reflected light (i.e., reflected light intensity) detected by the light receiving unit 151*b*.

The third calculation unit 410 calculates a correction value for the amount of fluctuation in conveyance of the medium performed by the conveying device, the amount being calculated by the second calculation unit 409. The second calculation unit 409 and the third calculation unit 410 may calculate the amount of fluctuation in conveyance and the correction value, respectively, in a way described in, e.g., JP-2010-201792-A incorporated by reference herein.

In the present embodiment, the function of each of the data transmission unit 401, the read image acquisition unit 402, the master image generation unit 403, the first detection unit 404, the search unit 405, the first calculation unit 406, the second detection unit 407, the processing unit 408, the second calculation unit 409, and the third calculation unit 410 described above is implemented by the CPU 10 executing a program stored in, e.g., the ROM 30.

Alternatively, for example, at least part of the function of each of the data transmission unit 401, the read image acquisition unit 402, the master image generation unit 403, the first detection unit 404, the search unit 405, the first calculation unit 406, the second detection unit 407, the processing unit 408, the second calculation unit 409, and the third calculation unit 410 described above may be implemented by a dedicated hardware circuit.

The program executed by the inspection apparatus 102 of the present embodiment may be stored in a computer-readable storage medium, such as a CD-ROM, an FD, a CD-R, and a DVD, in an installable or executable file format, to be provided.

Alternatively, the program executed by the printer 101 of the present embodiment may be stored in a computer connected to a network such as the Internet and downloaded via the network, to be provided. The program executed by the inspection apparatus 102 of the present embodiment may be provided or distributed via a network such as the Internet.

Each of the functions of the embodiments described above may be implemented by one or more processing circuits or circuitry. The processing circuit or circuitry herein includes a processor programmed to execute the functions by software such as a processor implemented by an electronic circuit. The processing circuit or circuitry also includes devices such as an ASIC, a digital signal processor (DSP), a field programmable gate array (FPGA), and conventional circuit components arranged to perform the recited functions.

Figure 14:
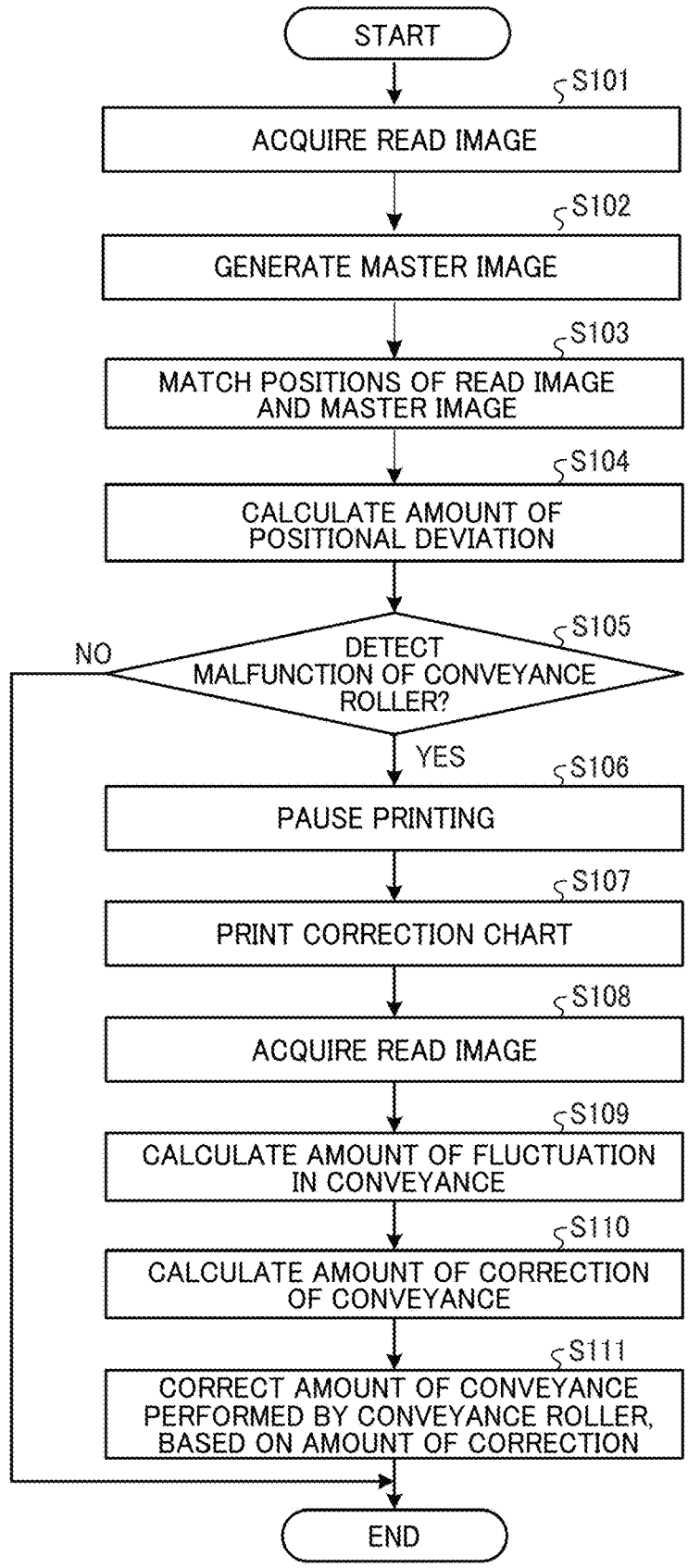
FIG. 14 is a flowchart of a process performed by an image forming system, according to an embodiment of the present disclosure.

Referring now to FIG. 14, a description is given of a process performed by the image forming system 100.

FIG. 14 is a flowchart of a process performed by the image forming system 100, according to an embodiment of the present disclosure.

Firstly, as a premise, the DFE 104 receives a print job from the client 201. The DFE 104 generates bitmap data as an output target image, based on the received print job.

The DFE 104 transmits the generated bitmap data to the data transmission unit 301 of the printer 101. The print control unit 302 prints, on a medium, the bitmap data received by the data transmission unit 301. The printed medium is read by the reading device 131 of the inspection apparatus 102.

In step S101, the read image acquisition unit 402 acquires, as a read image, an image read by the reading device 131.

In step S102, the master image generation unit 403 generates a master image, based on the bitmap data received from the DFE 104 by the data transmission unit 401 of the inspection apparatus 102.

In step S103, the first detection unit 404 detects a reference point from the master image generated by the master image generation unit 403. The search unit 405 matches the positions of the read image acquired by the read image acquisition unit 402 and the master image generated by the master image generation unit 403, so as to search for a corresponding point of the read image corresponding to the reference point of the master image.

In step S104, the first calculation unit 406 calculates an amount of positional deviation from the coordinates of the reference point of the master image and the coordinates of the corresponding point of the read image.

A detailed description of the respective operations in steps S103 and S104 is deferred.

In step S105, the second detection unit 407 detects whether the conveying device (e.g., conveyance roller pair 114) malfunctions, from the amount of positional deviation calculated by the first calculation unit 406.

When the second detection unit 407 detects a malfunction of the conveying device (YES in step S105), the processing unit 408 causes the data transmission unit 401 of the inspection apparatus 102 to transmit an instruction of pausing printing to the data transmission unit 301 of the printer 101.

In step S106, the print control unit 302 pauses printing.

The processing unit 408 causes the data transmission unit 401 of the inspection apparatus 102 to transmit an instruction of printing a correction chart to the data transmission unit 301 of the printer 101.

In step S107, the print control unit 302 prints the correction chart stored in the storage device 40 of the controller of the printer 101.

The reading device 131 of the inspection apparatus 102 reads the correction chart printed by the print control unit 302.

In step S108, the read image acquisition unit 402 acquires a read image of the correction chart.

In step S109, the second calculation unit 409 calculates an amount of fluctuation in conveyance performed by the conveying device, from the read image of the correction chart acquired by the read image acquisition unit 402.

In step S110, the third calculation unit 410 calculates an amount of correction of conveyance performed by the conveying device, based on the amount of fluctuation in conveyance calculated by the second calculation unit 409. Then, the data transmission unit 401 of the inspection apparatus 102 transmits the amount of correction calculated by the third calculation unit 410 to the data transmission unit 301 of the printer 101.

In step S111, the conveyance control unit 303 corrects the amount of conveyance performed by the conveying device, based on the amount of correction received by the data transmission unit 301. Thus, the present process ends.

By contrast, when the second detection unit 407 does not detect a malfunction of the conveying device (NO in step S105), the image forming system 100 continues printing while ending the present process.

Figure 15:
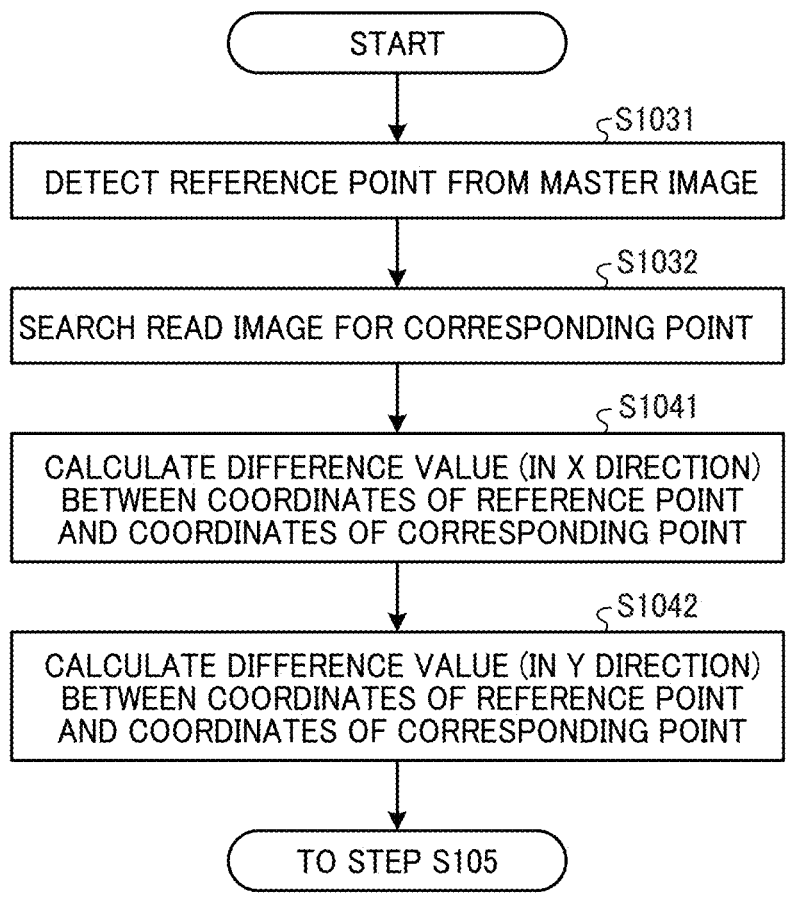
FIG. 15 is a flowchart of a process of calculating an amount of positional deviation, according to an embodiment of the present disclosure.

Referring now to FIG. 15, a detailed description is given of a process of calculating the amount of positional deviation.

FIG. 15 is a flowchart of a process of calculating an amount of positional deviation, according to an embodiment of the present disclosure.

Firstly, in step S1031, the first detection unit 404 detects a reference point from a master image generated by the master image generation unit 403.

Next, in step S1032, the search unit 405 searches a read image acquired by the read image acquisition unit 402 for a corresponding point corresponding to the reference point of the master image detected by the first detection unit 404.

In step S1041, the first calculation unit 406 calculates, as an amount of positional deviation in the X direction, a difference value between the coordinates of the master image (specifically, the coordinates of the reference point) and the coordinates of the read image (specifically, the coordinates of the corresponding point) in the X direction.

In step S1042, the first calculation unit 406 calculates, as an amount of positional deviation in the Y direction, a difference value between the coordinates of the master image (specifically, the coordinates of the reference point) and the coordinates of the read image (specifically, the coordinates of the corresponding point) in the Y direction.

Then, the second detection unit 407 performs the operation of step S105 illustrated in FIG. 14.

A typical technique has some difficulties in automatically detecting fluctuations in the medium conveyance amount. When a user visually recognizes the fluctuations in the medium conveyance amount and determines that the medium conveyance amount is to be corrected, the user manually causes a reading device to read a correction chart. Therefore, for example, in the case of unattended printing such as nighttime printing, the fluctuations in the medium conveyance amount remain uncorrected.

To address such an unfavorable situation, an image forming system of an embodiment of the present disclosure attains some advantages as described below.

According to the present embodiment, the read image acquisition unit 402 of the inspection apparatus 102 acquires, as a read image, an image printed on a medium and read by the reading device 131. The master image generation unit 403 generates a master image, based on document data. The first calculation unit 406 calculates an amount of positional deviation between the master image and the read image. Based on the amount of positional deviation calculated by the first calculation unit 406, the second detection unit 407 detects a malfunction of a conveying device that conveys the medium.

Since each of the operations described above is performed even without any instruction from a user, the image forming system 100 of the present embodiment automatically detects a malfunction of the conveying device even when printing is performed unattended such as nighttime printing.

According to the present embodiment, when the second detection unit 407 detects the malfunction of the conveying device, the processing unit 408 of the inspection apparatus 102 causes the printer 101 to print a correction chart for correction of fluctuations in conveyance of the medium. The second calculation unit 409 calculates, from a read image of the printed correction chart, an amount of fluctuation in conveyance of the medium performed by the conveying device. The third calculation unit 410 calculates a correction value for the amount of fluctuation in conveyance of the medium calculated by the second calculation unit 409.

The conveyance control unit 303 of the printer 101 automatically corrects the fluctuations in conveyance of the medium, based on the correction amount (i.e., correction value) calculated by the third calculation unit 410. Since each of the operations described above is performed even without any instruction from a user, the image forming system 100 automatically corrects a malfunction of the conveying device even when printing is performed unattended.

According to the present embodiment, the second detection unit 407 detects an abnormality in the medium conveyance speed in a case in which an absolute value of an amount of positional deviation in the sub-scanning direction calculated, for each of a plurality of reference points, by the first calculation unit 406 exceeds a first threshold value. Accordingly, the image forming system 100 detects fluctuations out of specified tolerance of speed fluctuations in the conveying device.

According to the present embodiment, the second detection unit 407 detects an abnormality in the medium conveyance speed in a case in which the amount of positional deviation in the sub-scanning direction calculated, for each of the plurality of reference points including a first reference point and a second reference point adjacent to the first reference point in the sub-scanning direction, by the first calculation unit 406 is equal to or less than the first threshold value and a difference value between the amount of positional deviation in the sub-scanning direction calculated for the first reference point and the amount of positional deviation in the sub-scanning direction calculated for the second reference point exceeds a second threshold value.

Accordingly, the image forming system 100 detects fluctuations in the medium conveyance speed to be corrected in the conveyance device, though the fluctuations are within the specified tolerance of speed fluctuations.

According to the present embodiment, the second detection unit 407 detects that the first calculation unit 406 has failed to calculate the amount of positional deviation in a case in which a difference value between the amount of positional deviation in the sub-scanning direction calculated for one of the plurality of reference points corresponding to a first area and the amount of positional deviation in the sub-scanning direction calculated for another one of the reference points corresponding to a second area adjacent to the first area in the main scanning direction exceeds a third threshold value.

Accordingly, the image forming system 100 of the present embodiment eliminates a malfunction of the conveying device that is detected due to the failure of the first calculation unit 406 to calculate the amount of positional deviation, thus refraining from performing unnecessary processing such as printing an unnecessary correction chart. In other words, the productivity is enhanced.

According to the present embodiment, the second detection unit 407 detects an abnormal medium skew in the conveying device in a case in which a direction of positional deviation along the main scanning direction for one of the reference points for which the abnormality in the medium conveyance speed is detected is different from a direction of positional deviation along the main scanning direction for another one of the reference points for which the abnormality in the medium conveyance speed is not detected.

Accordingly, the image forming system 100 of the present embodiment detects an abnormal medium skew, in addition to an abnormality in the medium conveyance speed.

According to the embodiments of the present disclosure, a malfunction of a conveying device is automatically detected and automatically corrected.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An information processing apparatus comprising circuitry configured to:
   acquire, as a first image, a read image of an image formed on a medium by a print engine of an image forming apparatus;
   generate, as a second image, an image to be compared with the first image, based on document data;
   detect a plurality of reference points from the second image;
   compare the first image with the second image to calculate an amount of positional deviation of the medium for each of the plurality of reference points;
   detect, based on the amount of positional deviation, a malfunction of a conveying device that conveys the medium to the print engine of the image forming apparatus;
   cause the image forming apparatus to print a correction chart for correction of conveyance of the medium, in response to detection of the malfunction of the conveying device;
   calculate, from a read image of the correction chart, an amount of fluctuation in conveyance of the medium performed by the conveying device;
   calculate a correction value for the calculated amount of fluctuation in conveyance of the medium; and
   correct an amount of conveyance performed by the conveying device, based on the calculated correction value.

2. The information processing apparatus according to claim 1,
   wherein the circuitry is configured to calculate, for each of the plurality of reference points, an amount of positional deviation of the medium in a sub-scanning direction in which the medium is conveyed, and
   wherein the circuitry is configured to detect an abnormality in a medium conveyance speed at which the conveying device conveys the medium, in a case in which the calculated amount of positional deviation of the medium in the sub-scanning direction exceeds a threshold value.

3. The information processing apparatus according to claim 2,
   wherein the plurality of reference points includes:
      a first reference point; and
      a second reference point adjacent to the first reference point in the sub-scanning direction, and
   wherein the circuitry is configured to detect the abnormality in the medium conveyance speed in a case in which:
      the calculated amount of positional deviation of the medium in the sub-scanning direction is equal to or less than the threshold value; and
      a difference value between an amount of positional deviation in the sub-scanning direction calculated for the first reference point and an amount of positional deviation in the sub-scanning direction calculated for the second reference point exceeds another threshold value.

4. The information processing apparatus according to claim 3,
   wherein the circuitry is configured to:
      divide the second image into a plurality of areas including:
         a first area; and
         a second area adjacent to the first area in a main scanning direction perpendicular to the sub-scanning direction; and
      detect the plurality of reference points corresponding to the plurality of areas, and
   wherein the circuitry is configured to detect no abnormality in the medium conveyance speed in a case in which a difference value between the amount of positional deviation in the sub-scanning direction calculated for one of the plurality of reference points corresponding to the first area and the amount of positional deviation in the sub-scanning direction calculated for another one of the plurality of reference points corresponding to the second area exceeds still another threshold value.

5. The information processing apparatus according to claim 4,
   wherein the circuitry is configured to detect an abnormal skew of the medium in the conveying device in a case in which a direction of positional deviation along the main scanning direction for one of the plurality of reference points for which the abnormality in the medium conveyance speed is detected is different from a direction of positional deviation along the main scanning direction for another one of the plurality of reference points for which the abnormality in the medium conveyance speed is not detected.

6. An image forming system comprising:
   the information processing apparatus according to claim 1; and
   an image forming apparatus configured to form the image on the medium.

7. A control method for an information processing apparatus, the method comprising:
   acquiring, as a first image, a read image of an image formed on a medium by a print engine of an image forming apparatus;

generating, as a second image, an image to be compared with the first image, based on document data;

detecting a plurality of reference points from the second image;

comparing the first image with the second image to calculate an amount of positional deviation of the medium for each of the plurality of reference points;

detecting, based on the amount of positional deviation, a malfunction of a conveying device that conveys the medium to the print engine of the image forming apparatus;

causing the image forming apparatus to print a correction chart for correction of conveyance of the medium, in response to the detecting the malfunction of the conveying device;

calculating, from a read image of the correction chart, an amount of fluctuation in conveyance of the medium performed by the conveying device;

calculating a correction value for the calculated amount of fluctuation in conveyance of the medium; and correcting an amount of conveyance performed by the conveying device, based on the calculated correction value.

8. The control method according to claim 7, further comprising:

calculating, for each of the plurality of reference points, an amount of positional deviation of the medium in a sub-scanning direction in which the medium is conveyed, and detecting an abnormality in a medium conveyance speed at which the conveying device conveys the medium, in a case in which the calculated amount of positional deviation of the medium in the sub-scanning direction exceeds a threshold value.

9. The control method according to claim 8, wherein the plurality of reference points includes:
a first reference point; and
a second reference point adjacent to the first reference point in the sub-scanning direction, and wherein the control method further includes detecting the abnormality in the medium conveyance speed in a case in which:
the calculated amount of positional deviation of the medium in the sub-scanning direction is equal to or less than the threshold value; and
a difference value between an amount of positional deviation in the sub-scanning direction calculated for the first reference point and an amount of positional deviation in the sub-scanning direction calculated for the second reference point exceeds another threshold value.

10. The control method according to claim 9, wherein the control method further includes:
divide the second image into a plurality of areas including:
a first area; and
a second area adjacent to the first area in a main scanning direction perpendicular to the sub-scanning direction; and
detect the plurality of reference points corresponding to the plurality of areas, and wherein the control method further includes detecting no abnormality in the medium conveyance speed in a case in which a difference value between the amount of positional deviation in the sub-scanning direction calculated for one of the plurality of reference points corresponding to the first area and the amount of positional deviation in the sub-scanning direction calculated for another one of the plurality of reference points corresponding to the second area exceeds still another threshold value.

11. The control method according to claim 10, further comprising:

detecting an abnormal skew of the medium in the conveying device in a case in which a direction of positional deviation along the main scanning direction for one of the plurality of reference points for which the abnormality in the medium conveyance speed is detected is different from a direction of positional deviation along the main scanning direction for another one of the plurality of reference points for which the abnormality in the medium conveyance speed is not detected.

12. A non-transitory computer-readable storage medium storing computer-readable program code that causes an information processing apparatus to perform a control method, the control method comprising:

acquiring, as a first image, a read image of an image formed on a medium by a print engine of an image forming apparatus;

generating, as a second image, an image to be compared with the first image, based on document data;

detecting a plurality of reference points from the second image;

comparing the first image with the second image to calculate an amount of positional deviation of the medium for each of the plurality of reference points;

detecting, based on the amount of positional deviation, a malfunction of a conveying device that conveys the medium to print engine of an image forming apparatus;

causing the image forming apparatus to print a correction chart for correction of conveyance of the medium, in response to the detecting the malfunction of the conveying device;

calculating, from a read image of the correction chart, an amount of fluctuation in conveyance of the medium performed by the conveying device;

calculating a correction value for the calculated amount of fluctuation in conveyance of the medium; and correcting an amount of conveyance performed by the conveying device, based on the calculated correction value.

13. The non-transitory computer-readable storage medium according to claim 12, wherein the control method further includes calculating, for each of the plurality of reference points, an amount of positional deviation of the medium in a sub-scanning direction in which the medium is conveyed, and detecting an abnormality in a medium conveyance speed at which the conveying device conveys the medium, in a case in which the calculated amount of positional deviation of the medium in the sub-scanning direction exceeds a threshold value.

14. The non-transitory computer-readable storage medium according to claim 13, wherein the plurality of reference points includes:
a first reference point; and
a second reference point adjacent to the first reference point in the sub-scanning direction, and wherein the control method further includes detecting the abnormality in the medium conveyance speed in a case in which:

the calculated amount of positional deviation of the medium in the sub-scanning direction is equal to or less than the threshold value; and a difference value between an amount of positional deviation in the sub-scanning direction calculated for the first reference point and an amount of positional deviation in the sub-scanning direction calculated for the second reference point exceeds another threshold value.

15. The non-transitory computer-readable storage medium according to claim 14, wherein the control method further includes:
divide the second image into a plurality of areas including:
a first area; and
a second area adjacent to the first area in a main scanning direction perpendicular to the sub-scanning direction; and
detect the plurality of reference points corresponding to the plurality of areas, and
wherein the control method further includes detecting no abnormality in the medium conveyance speed in a case in which a difference value between the amount of positional deviation in the sub-scanning direction calculated for one of the plurality of reference points corresponding to the first area and the amount of positional deviation in the sub-scanning direction calculated for another one of the plurality of reference points corresponding to the second area exceeds still another threshold value.

16. The non-transitory computer-readable storage medium according to claim 15, wherein the control method further includes detecting an abnormal skew of the medium in the conveying device in a case in which a direction of positional deviation along the main scanning direction for one of the plurality of reference points for which the abnormality in the medium conveyance speed is detected is different from a direction of positional deviation along the main scanning direction for another one of the plurality of reference points for which the abnormality in the medium conveyance speed is not detected.

* * * * *